United States Patent
Robalewski et al.

(10) Patent No.: US 7,904,899 B2
(45) Date of Patent: Mar. 8, 2011

(54) THIRD-PARTY CUSTOMIZATION OF A CONFIGURATION FILE

(75) Inventors: Randy Robalewski, Los Gatos, CA (US); Michael J. Rainwater, Frisco, TX (US); Jefrey Owen Pfeiffer, Lewisville, TX (US)

(73) Assignee: Intuit Inc., Mountain View, CA (US)

( * ) Notice: Subject to any disclaimer, the term of this patent is extended or adjusted under 35 U.S.C. 154(b) by 1296 days.

(21) Appl. No.: 11/471,755

(22) Filed: Jun. 20, 2006

(65) Prior Publication Data

US 2007/0294669 A1 Dec. 20, 2007

(51) Int. Cl.
*G06F 9/445* (2006.01)

(52) U.S. Cl. .......................................... 717/174; 717/168

(58) Field of Classification Search .......................... None
See application file for complete search history.

(56) References Cited

U.S. PATENT DOCUMENTS

| | | | |
|---|---|---|---|
| 5,414,812 A * | 5/1995 | Filip et al. .............................. 1/1 |
| 5,710,889 A * | 1/1998 | Clark et al. .................... 235/379 |
| 5,946,667 A * | 8/1999 | Tull et al. .................... 705/36 R |
| 6,029,196 A * | 2/2000 | Lenz ............................ 709/221 |
| 6,249,905 B1 * | 6/2001 | Yoshida et al. ............... 717/100 |
| 6,249,909 B1 * | 6/2001 | Russo et al. ................... 717/100 |
| 6,654,797 B1 * | 11/2003 | Kamper ........................ 709/220 |
| 6,672,505 B1 * | 1/2004 | Steinmetz et al. ............. 235/379 |
| 6,925,468 B1 * | 8/2005 | Bobbitt et al. ......................... 1/1 |
| 6,941,363 B2 * | 9/2005 | Ito et al. ........................ 709/223 |
| 7,051,101 B1 * | 5/2006 | Dubrovsky et al. ........... 709/225 |
| 7,120,597 B1 * | 10/2006 | Knudtzon et al. ............... 705/30 |
| 7,640,198 B1 * | 12/2009 | Albanese et al. ............... 705/35 |
| 2001/0020291 A1 * | 9/2001 | Kudukoli et al. .................. 717/1 |
| 2002/0055991 A1 * | 5/2002 | Arrouye et al. ............... 709/220 |
| 2003/0126050 A1 * | 7/2003 | Theiss et al. ..................... 705/35 |
| 2003/0140333 A1 * | 7/2003 | Odaka et al. .................. 717/115 |
| 2003/0216629 A1 * | 11/2003 | Aluri et al. .................... 600/407 |
| 2003/0229686 A1 * | 12/2003 | Kortright ...................... 709/220 |
| 2004/0128644 A1 * | 7/2004 | Hurst et al. ................... 717/100 |
| 2004/0194053 A1 * | 9/2004 | Bonsma ........................ 717/100 |
| 2005/0091227 A1 * | 4/2005 | McCollum et al. ........... 707/100 |
| 2005/0228728 A1 * | 10/2005 | Stromquist ..................... 705/30 |
| 2005/0235247 A1 * | 10/2005 | Francis et al. ................ 717/100 |
| 2005/0289502 A1 * | 12/2005 | Mittal et al. .................. 717/100 |
| 2006/0015589 A1 * | 1/2006 | Ang et al. ..................... 709/220 |
| 2006/0112345 A1 * | 5/2006 | Singhal et al. ................ 715/763 |
| 2007/0029376 A1 * | 2/2007 | Stoutenburg et al. ......... 235/379 |

\* cited by examiner

*Primary Examiner* — Tuan Q Dam
*Assistant Examiner* — Samuel Hayim
(74) *Attorney, Agent, or Firm* — Osha • Liang LLP

(57) ABSTRACT

Systems and methods for customizing a configuration file. A system includes a configuror client that generates and exports a configuration file, a configuration sharing server that makes the configuration file assessable, and a configuree client that imports the configuration file. The configuration sharing server provides a community-based collection of configuration files for access by the public or by a specific organization. The configuree client can detect when a new profile is being used (e.g., the first time that the financial management application is executed after installation). In response, the configuration client begins an interview process for customizing the financial management application (e.g., by presenting a series of user interfaces). Part of the interview process allows an end-user to select a particular configuration file stored on the configuration sharing client or on a local memory device.

29 Claims, 8 Drawing Sheets

THIRD-PARTY CUSTOMIZATION OF A CONFIGURATION FILE

BACKGROUND

The present invention relates generally to software tools for financial management.

Maintaining financial records for home, and business, is a time-consuming, and frequent process. The advent of financial management applications has automated the process of maintaining financial records on a back-end and performing financial transactions on a front-end. Because the needs for financial management can be so varied, the financial management applications are designed to have a very general flow, until modified by the user.

Configuration of a financial management application can be a sophisticated process, especially for a novice end-user. In some cases, templates are provided to give the end-user a short cut to the configuration process. These templates can be general in nature because of varying needs even within a certain industry. For example, a chart of accounts used for a construction company that builds residential properties can be significantly different from a chart of accounts used for a construction company that builds commercial properties. Even within commercial construction, there can be variance between companies that focus on apartment buildings and companies that focus on strip malls. Therefore, it takes significant resources for a manufacturer of a financial management program to identify the particular nuances of niche industries so as to ensure correct configuration of the financial management application.

In addition, an interview process or wizard can walk the end-user through each step needed to set up the financial management application. Typically, the interview process is provided once, when a profile is initiated. Subsequent changes can require manual configuration. In addition, the interview process can request settings that the end-user is not able to provide due to lack of experience or for other reasons.

SUMMARY

The present invention provides systems and methods for sharing a customized configuration file. A configuration file, as referred to herein, can be a computer file containing commands, data, and/or executables that are used to customize the organization of data in, and/or the operation of, a software application such as a financial management application, or another configuration-intensive application. The configuration file may customize an end-user experience and/or contain data affecting the business rules or processing of business data. For example, in a financial management application, the configuration file provides customized views, customized reports, and private financial accounts and data associated with the end-user. In one embodiment, a system includes a configuror client that generates and exports a configuration file, a configuration sharing server that makes the configuration file assessable, and a configuree client that imports the configuration file.

In one embodiment, the configuration sharing server provides a community-based collection of configuration files for access by the public or by a specific organization. For example, a national organization can provide a configuration file for sharing with its regional members. That same configuration file can be made public in an effort to standardize varying bookkeeping practices of a certain industry.

The configuree client can detect when a new profile is being created by an end-user (e.g., the first time that the financial management application is executed after installation). In response, the configuree client begins an interview process for customizing the financial management application (e.g., by presenting a series of user interfaces). Part of the interview process allows an end-user to select a particular configuration file stored on the configuration sharing client or on a local memory device.

Various configurations of the system are possible. For example, the configuration file can be obtained by the configuree client directly from the configuror client via e-mail or a removable storage device. Alternatively, the configuration file can be obtained indirectly via the configuration sharing server. The medium for transporting the configuration file can be any type of network (e.g., a data network such as the Internet, or a telephone network such a cellular network).

Advantageously, the present invention allows a novice user to leverage the full potential of a financial management application.

The features and advantages described herein are not all inclusive, and, in particular, many additional features and advantages will be apparent to one skilled in the art in view of the drawings, specifications, and claims. Moreover, it should be noted that the language used in the specification has been principally selected for readability and instructional purposes and may not have been selected to circumscribe the claimed invention.

One skilled in the art will recognize that these Figures are merely examples of the operation of the invention according to one embodiment and that other configurations and modes of operation can be used without departing from the essential characteristics of the invention.

DETAILED DESCRIPTION

Systems and methods for sharing a customized configuration file are described. A configuration file, as referred to herein, can be a computer file containing commands, data, and/or executables that are used to customize the organization of data in, and/or the operation of, a software application (e.g., a financial management application; or another configuration-intensive application). The configuration file may customize an end-user experience and/or contain data affecting the business rules or processing of business data. For example, in a financial management application, the configuration file provides customized views, customized reports, and private financial accounts and data associated with the end-user. Data can be organized in accordance with norms of a certain industry, or peculiarities of niche practices or organization, based on to the configuration file.

For example, a chart of accounts can be preconfigured for branch offices of a national realty company. The chart of accounts provides descriptions of accounts for use in tracking income and expenses. In another example, a bill payment schedule can be preconfigured by an accountant for a novice user. In still another example, interfaces for a third-party program can be configured.

Figure 1:
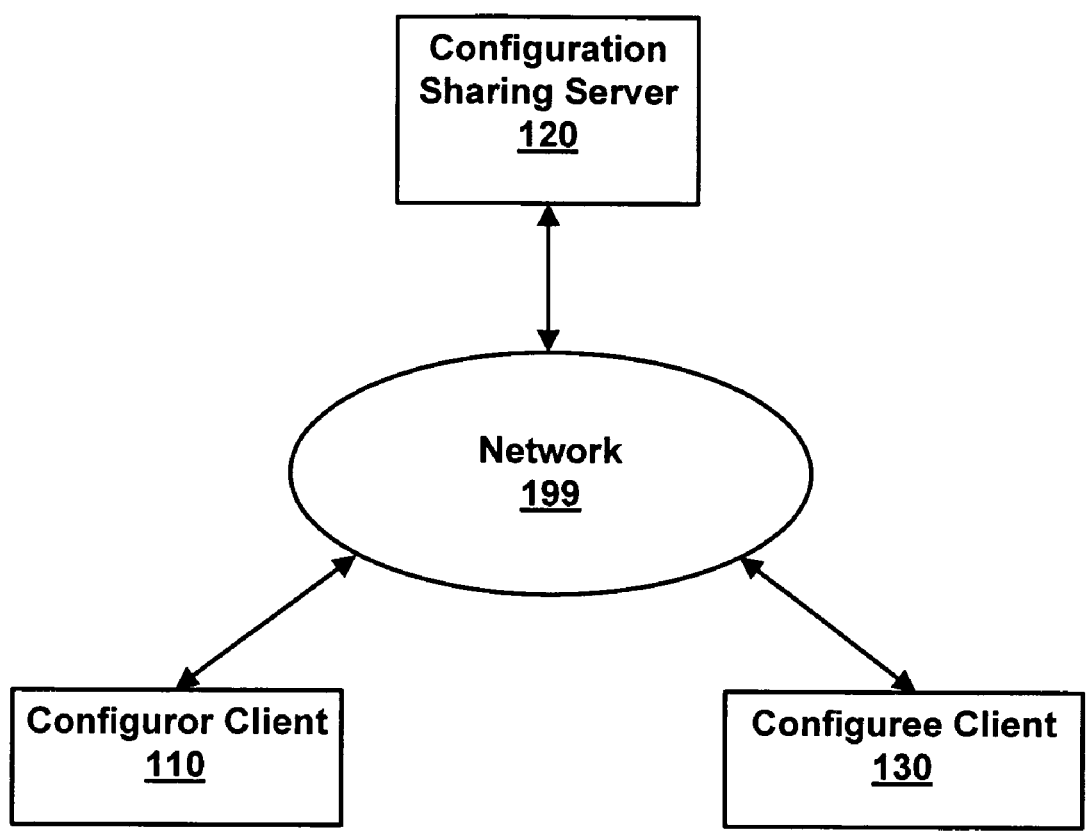
FIG. 1 is a block diagram illustrating a system for sharing a customized configuration file according to one embodiment of the present invention.

FIG. 1 is a block diagram illustrating a system 100 for customizing a configuration file according to one embodiment of the present invention. System 100 includes a configuror client 110, a configuration sharing server 130, and a configuree client 130. The components are communicatively coupled through a network 199. Each of the components can be, for example, a personal computer, a server blade, or other computing device with networking capabilities. Network 199 can be, for example, a public or private data network, combination of public and private data networks, the Internet, a telephone network, a wireless network, or other network capable of communicatively coupling two computing devices.

Figure 2:
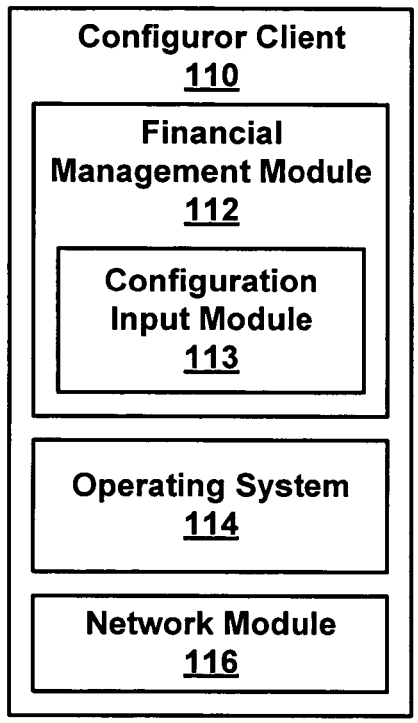
FIG. 2 is a block diagram illustrating a configuror client of the system of FIG. 1 according to one embodiment of the present invention.

Configuror client 110 generates a configuration file which is sent to configuration sharing server 120. Referring to FIG. 2, there is shown configuror client 110 including a financial management module 112, an operating system 114, and a network module 116. Financial management module 112 can be a software application or module executing in cooperation with operating system 114. Financial management module 112 can provide any services such bill payment, payroll, check writing, charts of accounts, inventory management, or other financial service used in personal or business financial management. Financial management module 112 can include a configuration input module 113 that is a sub-module, a patch, or a separate application. A user can utilize configuration input module 113 to preconfigure default settings (e.g., settings to select an industry, or a settings to compile a chart of accounts) for a particular use as described below. The user can then export the default settings stored in a configuration file. The default settings can further be configured as modifiable, in which the end-user can use a default setting as recommendations subject to change, or unmodifiable, in which the end-user is not presented with an opportunity to change a default setting. In one embodiment, the configuration file is stored in an open or proprietary file format such as comma separated values file format, Intuit QuickBooks™ file format, Intuit Quicken™ file format, or Microsoft Money™ file format, or another format capable of representing configuration information. In one embodiment, each line of the configuration file includes a command and an argument. Other types of configuration files are possible (e.g., only commands, only data, or executable software modules). Network module 116 (e.g., a software communications port and/or a network interface card) cooperates with operating system 114 (e.g., a Windows-type or a Linux-type operating system or a mobile operating system) to upload the configuration file to server 120 through network 199.

Figure 3:
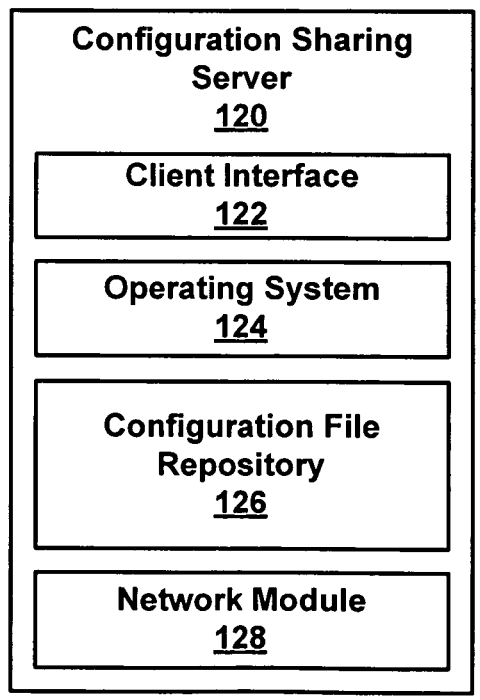
FIG. 3 is a block diagram illustrating a configuration sharing server of the system of FIG. 1 according to one embodiment of the present invention.

Configuration sharing server 120 of FIG. 1 can provide a collection of configuration files for access by the public or by a specific organization, provided by entities individually or as a community other than the operator of configuree client 130. Referring now to FIG. 3, configuration sharing server 120 further includes a client interface 122, an operating system 124, a configuration file repository 126, and a network module 128. Configuration sharing server 120 can be operated by, for example, the manufacturer of financial management module 112, or by a third-party service. Client interface 122 presents user interfaces that allow clients to specify or upload and download configuration files. The client interface can take many forms, included but not limited to HTML (Hypertext Markup Language), XML (Extensible Markup Language), wiki Markup, or any other method for collecting configuration data. Both the specification and the receipt of configuration data may also be done transparently within a given business application which uses such data. For example, a list of configuration files can be presented, each having a description and author name. In addition, client interface 122 can provide, or have an accompanying module that can provide, an indexing or searching service for downloading users that want to identify a particular type of configuration file. During uploading or downloading, operating system 124 interacts with client interface 122 and configuration file repository 126 to store and retrieve configuration files. In one embodiment, network module 128 receives uploading configurations files and sends downloading configuration files via network 199.

Figure 4:
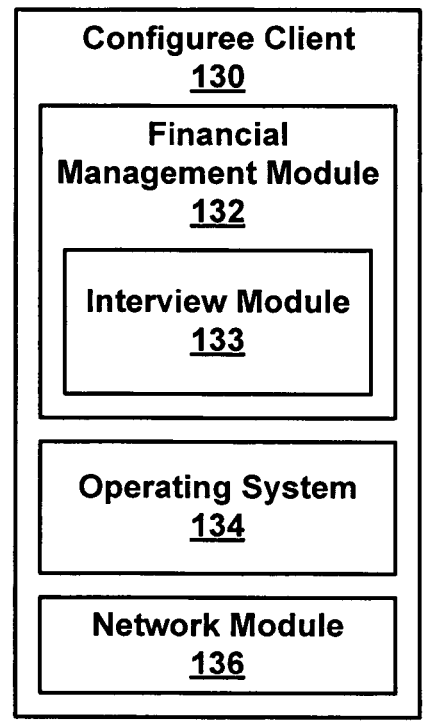
FIG. 4 is a block diagram illustrating a configuree client of the system of FIG. 1 according to one embodiment of the present invention.

Configuree client 130 of FIG. 1 uses the configuration file for customizing an application. Configuree client 130 further includes a financial management module 132, an operating system 134, and a network module 136 as shown in FIG. 4. In one embodiment, these components can be similar to the components of configuror client 110 as described above. Financial management module 132 includes an interview module 133 which can be a sub-module, a patch, or a separate application. During an initial use of financial management module 132 (e.g., after install, or upon initiating a new company file), interview module 133 presents a configuration script. In one embodiment, the configuration script executes prior to allowing untethered access to a company file in order to direct a user to entering the appropriate settings for a particular purpose. The configuration script can include a series of user interfaces with selections (e.g., buttons; textboxes; or check boxes) to determine how financial data should be organized and presented to the user. In one embodiment, configuree client 130 connects to configuration sharing server 120 to download a configuration file chosen by the user. In another embodiment, rather than proceeding directly to general application use after downloading the configuration file, a modified configuration script is executed in order to gather further information or to refine the predefined settings.

The components presented in FIGS. 1 to 4 are merely exemplary. One of ordinary skill in the art will recognize that many alternative configurations can operate without departing from the characteristics of the present invention. For example, in one embodiment, configuration sharing server 120 is not needed because configuror client 110 can transport the configuration file directly to configuree client 130 via, for example, e-mail. Examples of methods operating within system 100 are described below.

Figure 5:
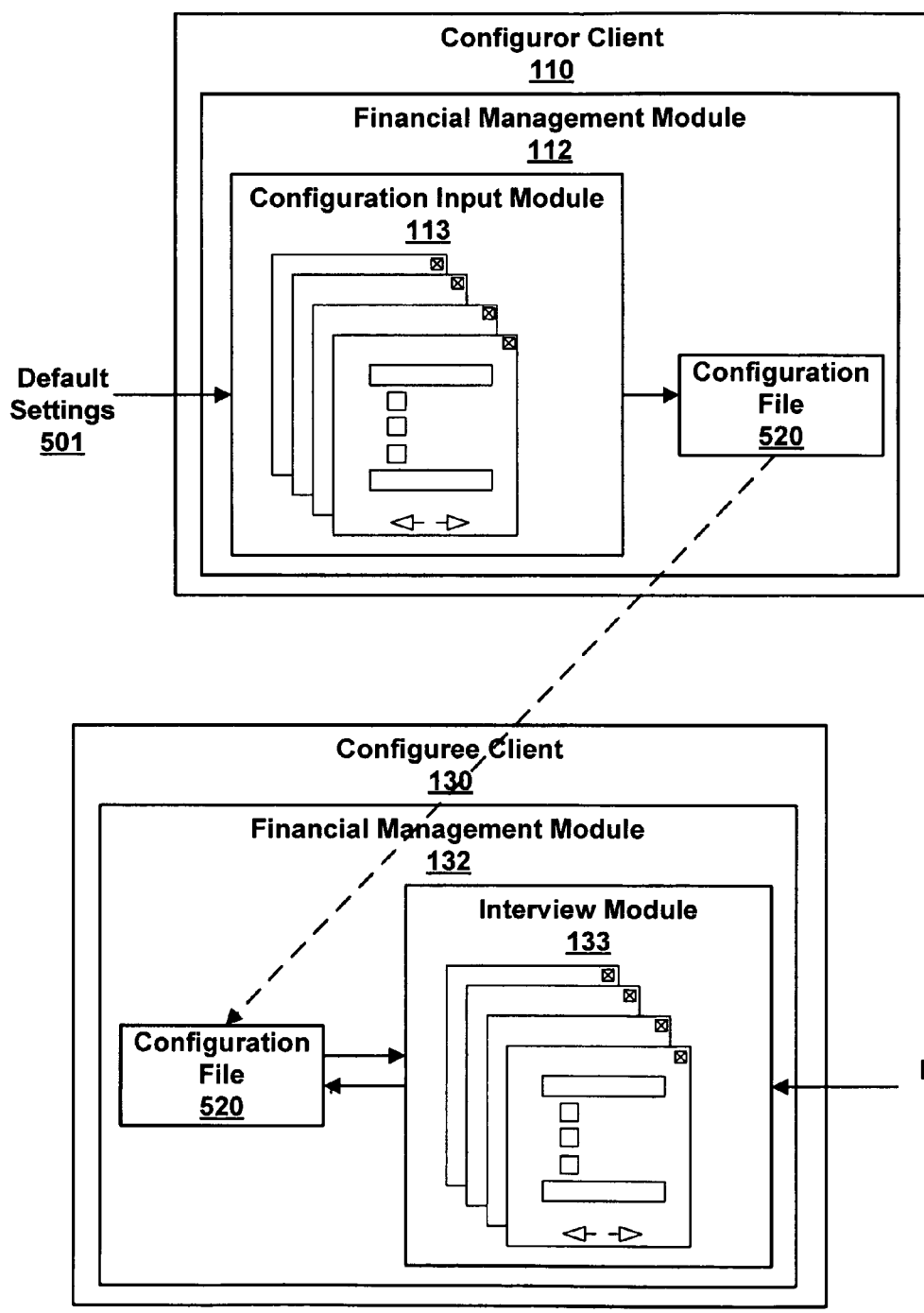
FIG. 5 is a schematic diagram illustrating a data flow of a configuration file according to one embodiment of the present embodiment.

FIG. 5 is a schematic diagram illustrating a data flow 500 of a configuration file in system 100 of FIG. 1 according to one embodiment of the present invention. At configuror client 110, default settings 501 are entered into configuration input module 113 by, for example, an administrator authorized by an organization. Financial management module 112 generates configuration file 520 from default settings 501 of configuration script 510 and, optionally, additional data and metadata needed by financial management module 132.

At configuree client 130, configuration file 520 is received and entered into interview module 133 before receiving additional input from an end-user. Thus, when an end-user views a configuration script, many of the options are already selected as a result of the default settings. The end-user can modify or supplement the default settings with end-user settings 502. The default and end-user settings 501, 502 are stored in configuration file 520 for use when executing a profile in financial management module 132.

Figure 6:
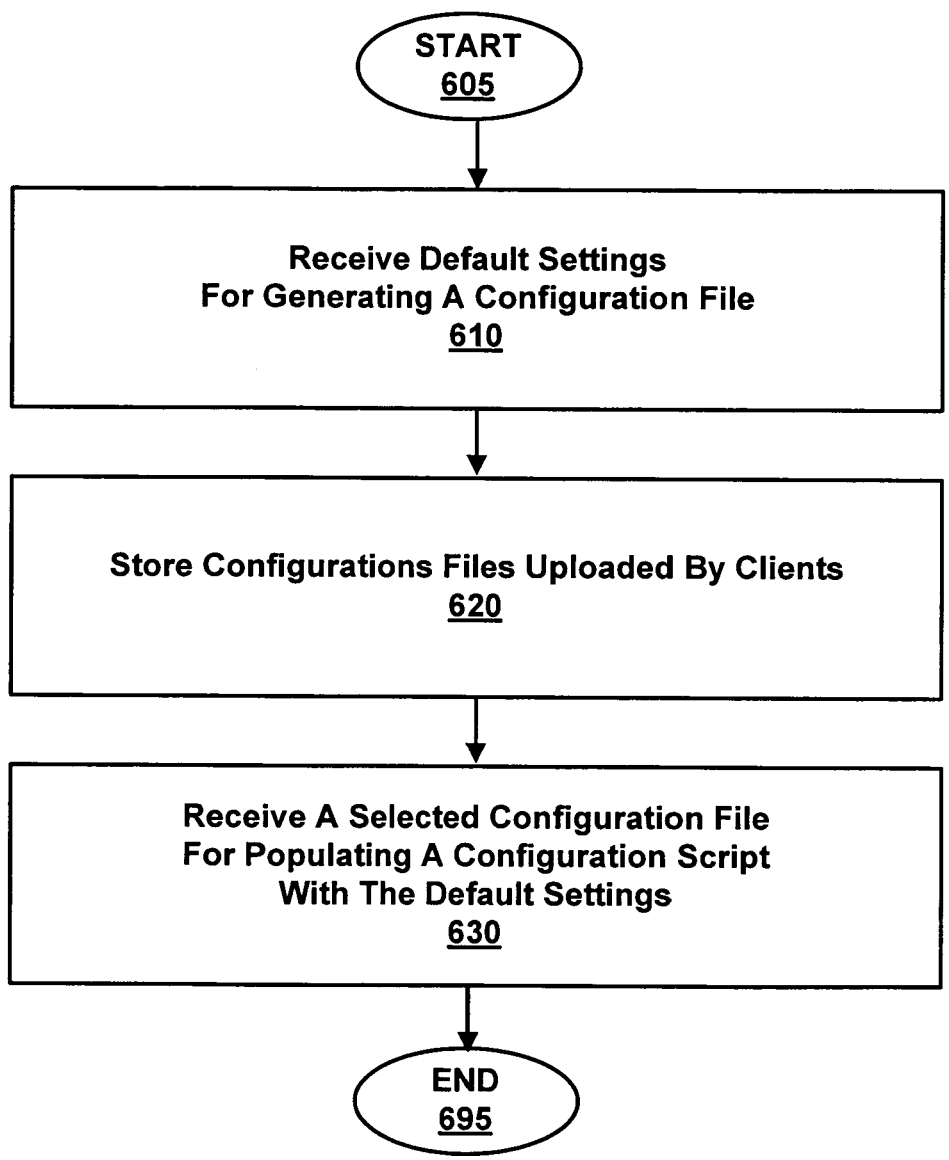
FIG. 6 is a flow chart illustrating a method for sharing a customized configuration file according to one embodiment of the present invention.

FIG. 6 is a flow chart illustrating a method 600 for sharing a configuration file according to one embodiment of the present invention. In one embodiment, method 600 is implemented in system 100 which can also be means for performing method 600. Generally, configuration files can be published to a third-party service that distributes community-contributed content.

Figure 7A:
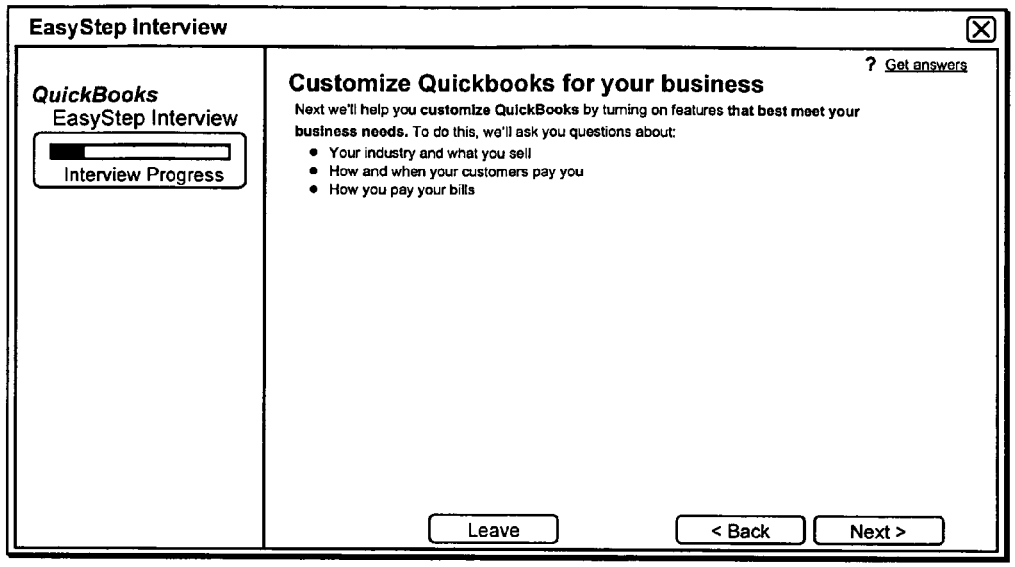
FIGS. 7A-F are screen shots illustrating examples of user interfaces presented in accordance with the configuration script according to one embodiment of the present invention.
Figure 7B:
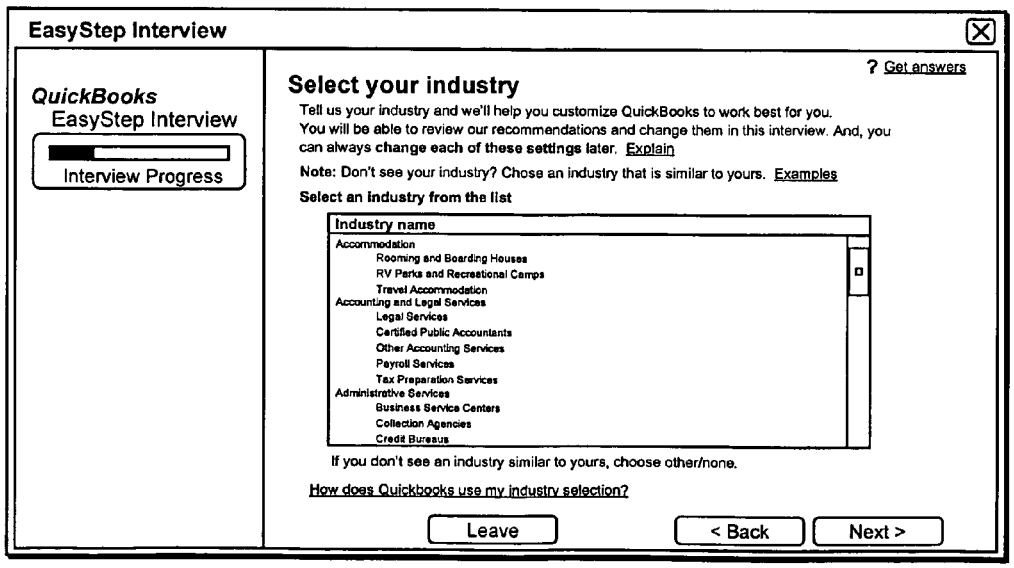

A user generates a configuration file while executing financial management module 112 at configuror client 110. A user can set up the configuration file, for example, directly by using a settings editor, or indirectly exporting settings used on a local executed financial management application. The configuring user can be an industry expert that generates a specialized configuration file for an industry (or organization or other type of group) in effort to standardize accounting practices. The configuring user can also be an end-user that has taken a customization file used across a general industry and customized it for a special niche practice. The configuror client 110 receives 610 default settings which are used to generate a configuration file One process of setting up the configuration file includes an interview process in which a series of user interface screens are presented to the user. Examples of user interface screens 700A-F are shown in FIGS. 7A-F. In FIG. 7A, a user interface 700A begins a portion of the interview process that a corporation or organization can use to customize settings (i.e., default settings) for use by subsidiaries or members. The default settings are customized in accordance with, for example, an industry, the types of products sold, how and when the customer makes payment, and how bills are paid. More specifically, in FIG. 7B, a user interface 700B allows a user to select from a number of pre-configured settings for various industries. The financial services module can use a template based on the choice industry. The template provides high-level settings that are best estimates of industry norms, but needs to be modified for most users.

Figure 7C:
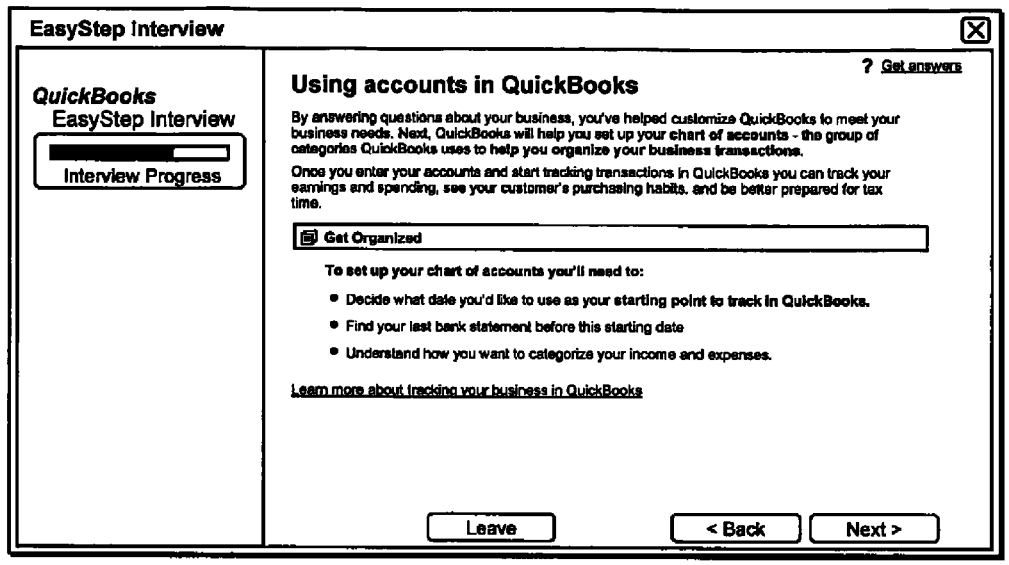
Figure 7D:
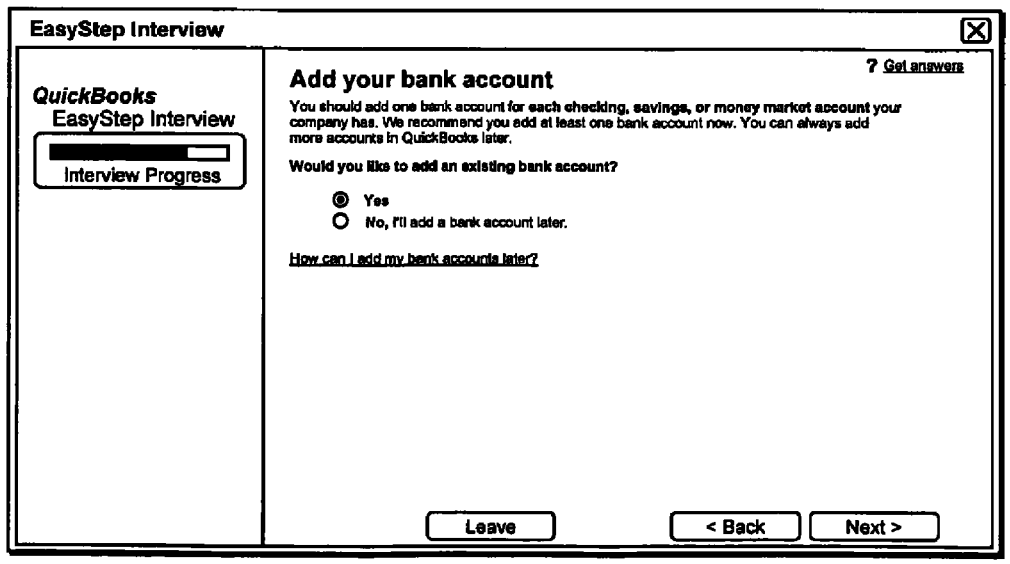
Figure 7E:
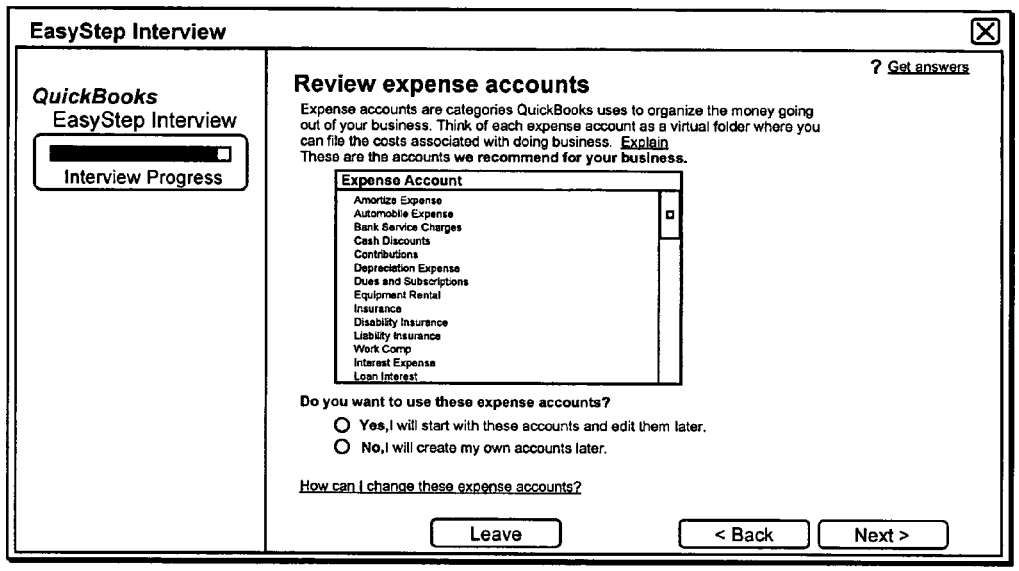
Figure 7F:
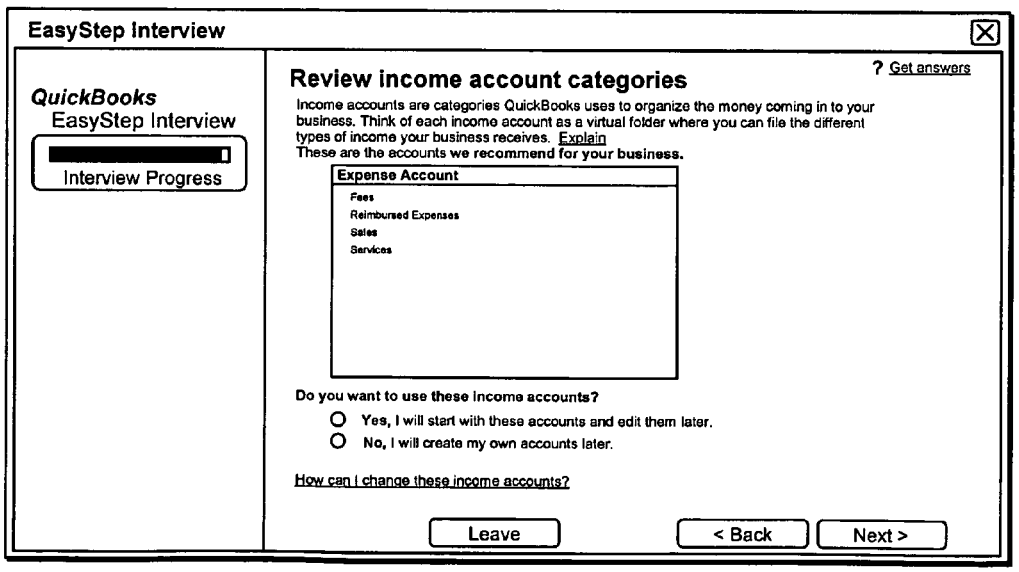

In FIG. 7C, a user interface 700C allows the user to select a chart of accounts. The chart of accounts provides descriptions of accounts for use in tracking income and expenses. The description can include a name of the account and an identification number. The descriptions comport with accounting standards. For example, 1000s correspond to assets, 2000s correspond to liabilities, 3000s correspond to equity, 4000s correspond to income, 5000s correspond to expenses. Each series has further detail, for example, 1100s correspond specifically to receivable assets. FIG. 7E includes a user interface 700E that allows expense accounts to be selected from a list, and FIG. 7F includes a user interface 700F that allows income accounts to be selected from a list.

Additional settings can include data that is unique to the company, entity, or organization. In FIG. 7D, the user can enter bank accounts that are associated with members of the organization to the chart of accounts. For example, a checking, savings, or money market account can be added along with the account numbers and other data.

The configuration file includes various elements of syntax and/or data. In one embodiment, each line of the configuration file includes a command and an argument stored in a particular file format as described above. The configuration file can be stored on a local machine by financial services module 112. Additionally, metadata can be stored along with the configuration file to describe its applications and features.

Referring again to FIG. 6, configuror client 110 uploads the configuration file to configuration sharing server 120. A user can upload directly to the configuration sharing server, or configuror client 110 can automatically upload. In one embodiment, uploading is performed using network 199 which employs a packet-switched protocol such as Transmission Control Protocol over Internet Protocol, or TCP/IP. In other embodiments, uploading takes place via a telephone network such as a cellular network, or a data network within a cellular network. Configuration sharing server 120 stores 620 configuration files uploaded by clients in configuration file repository 126. A third-party service operating configuration sharing server 120 can provide access to the configuration files to the public. In one embodiment, access is restricted to members of a certain organization and/or to individuals who can supply requisite authentication credentials.

An end-user at configuree client 130 sets-up a new profile on financial management module 132. One of the configuration files on configuration sharing server 120 is selected, as described herein. In response, configuree client 130 receives 630 a selected configuration file from configuration sharing server 130 for populating a configuration script with the default settings. Execution of the configuration script with the default settings is described below with respect to FIG. 8.

Figure 8:
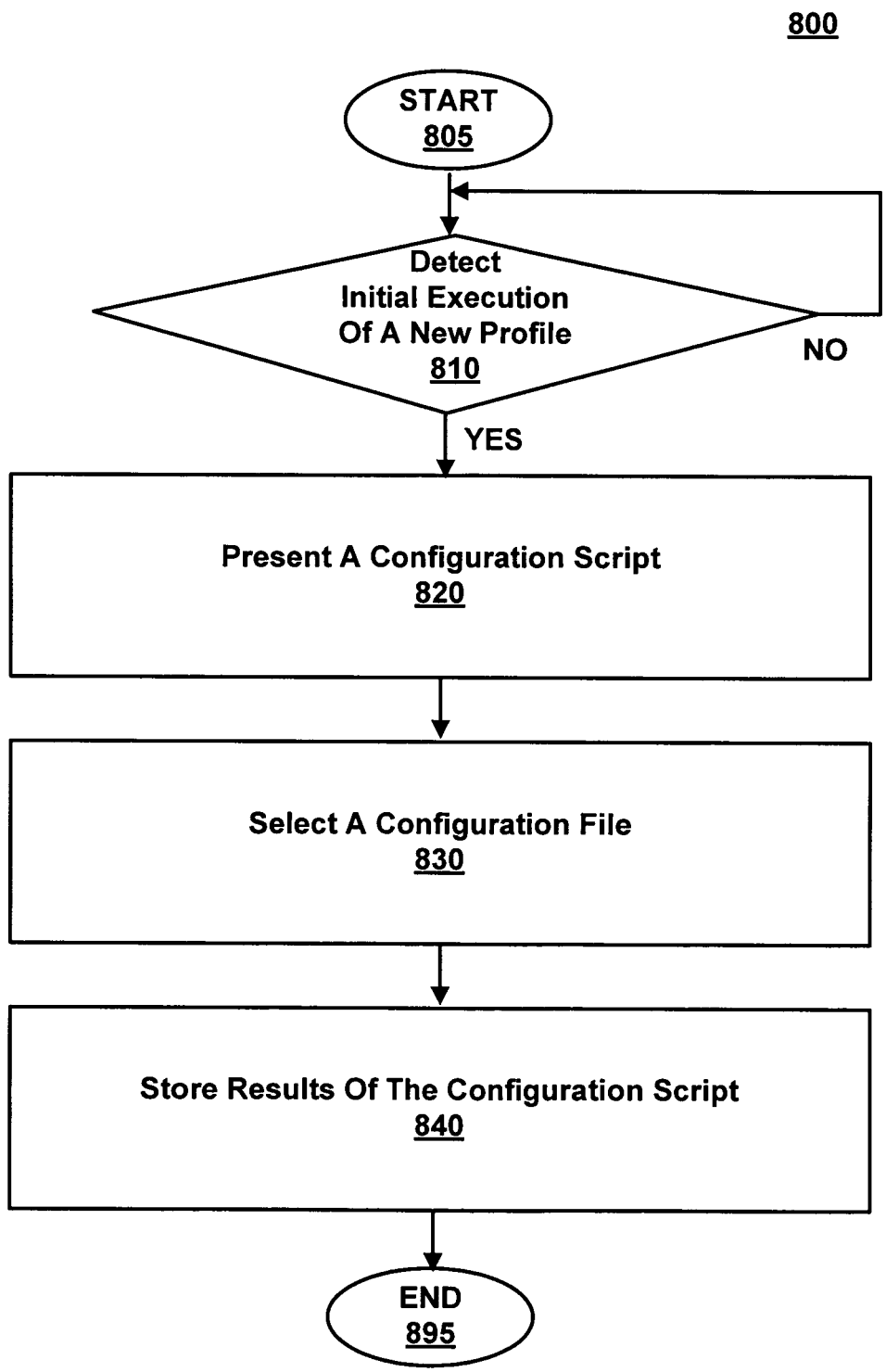
FIG. 8 is a flow chart illustrating a method for presenting a configuration script using a configuration file according to one embodiment of the present invention.

FIG. 8 is a flow chart illustrating an exemplary method 800 for executing the configuration script in further detail. Financial management module 132 detects 810 an initial execution of a new profile. The detection can be in response to an end-user executing financial management module 132 for the first time after installation, when the end-user making a selection from a drop down menu (e.g., selecting 'New Profile'), or in response to a profile that has no associated configuration file. If a profile has already established a configuration file, the configuration script is not invoked and financial management module 132 can continue to other processes.

In response to detecting the initial execution, interview module 133 financial management module 132 presents 820 the configuration script to receive user settings for the new profile. The end-user selects 830 a configuration file that is customized for the new profile. To do so, the end-user can select an option to import the configuration file from a source outside of financial management module 132 (e.g., from configuration sharing server 120). In one embodiment, a user interface can direct the end-user to available configuration files. In another embodiment, the end-user can independently download the configuration file. Configuration sharing server 120 can have a search feature to find an appropriate configuration file. For example, an end-user of a local Girl Scout chapter can use the search term 'Girl Scout' to find out if the national chapter has made a configuration file available. If not, the end-user can search alternatively for 'non-profit', 'children', or the city name of the local chapter. Any of these terms can provide a variety of shared configuration files that can be selected. In one embodiment, a relevancy score indicates how close of a match the search results are to the search query.

In one embodiment, financial management module 132 continues the interview process even though the configuration file has been selected. Thus, the end-user is able to verify and modify default settings through the ease of the interview process rather than having to do so manually.

Once the interview process has been completed, financial management module 132 stores 840 the results in association with the new profile. Accordingly, when the application is opened up in the future, reference can be made to the configuration file. Several configuration files can be stored on a single configure device, one associated with each profile (e.g., Organization A, Organization B, etc.).

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can be a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer-implemented method for customizing a configuration file, the method comprising:
   generating an industry-specific configuration file by a first financial management application executing on a configuror client associated with a first user;
   sending the generated industry-specific configuration file to a configuration file repository executing on a configuration sharing server, wherein the configuration file repository comprises a plurality of industry-specific configuration files;
   detecting execution of a new profile on a second financial management application executing on a configuree client associated with a second user, wherein the execution of the new profile triggers a configuration script that is configured to receive user settings for the new profile;
   selecting, in response to the detecting step, the generated industry-specific configuration file from the configuration file repository;
   retrieving, in response to the selecting step and by executing the configuration script, the generated industry-specific configuration file from the configuration file repository; and
   configuring, by executing the configuration script, the second financial management application using the generated industry-specific configuration file.

2. The method of claim 1, wherein the generated industry-specific configuration file is selected prior to executing the configuration script, and wherein the configuration script is configured in accordance with the generated industry-specific configuration file.

3. The method of claim 1, wherein the generated industry-specific configuration file data comprises business rules that affects data processing.

4. The method of claim 1, wherein the generated industry-specific configuration file comprises a chart of accounts.

5. The method of claim 1, wherein the generated industry-specific configuration file is associated with an organization, and the second user is a member of the organization.

6. The method of claim 1, wherein the with first user is an accountant, and the second user is a client of the accountant.

7. The method of claim 1, wherein the generated industry-specific configuration file comprises at least one of a command, a value, and an executable.

8. The method of claim 1, further comprising: requesting, by executing the configuration script, the user settings to supplement default settings of the generated industry-specific configuration file, wherein configuring the second financial management application using the generated industry-specific configuration file includes storing results of the user settings and the default settings.

9. The method of claim 1, wherein the configuration script comprises one or more user interfaces to enter settings for the second financial management application.

10. A system for customizing a configuration file, comprising:
   a configuror client associated with a first user and for executing a first financial management application configured to:
      generate an industry-specific configuration file; and
      send the generated industry-specific configuration file to a configuration file repository;
   a configuration sharing server comprising the configuration file repository, wherein the configuration file repository comprises a plurality of industry specific configuration files; and
   a configuree client associated with a second user and for executing:
      a second financial management application configured, to:
         detect an execution of a new profile,
            wherein the execution of the new profile triggers a configuration script configured to receive user settings for the new profile; and
         the configuration script configured to;
            retrieve the industry-specific configuration file from the configuration file repository; and
            configure the second financial management application using the industry-specific configuration file.

11. The system of claim 10, wherein the generated industry-specific configuration file is selected prior to executing the configuration script, and wherein the configuration script is configured in accordance with the generated industry-specific configuration file.

12. The system of claim 10, wherein the generated industry-specific configuration file comprises a chart of accounts.

13. The system of claim 10, wherein the generated industry-specific configuration file data comprises business rules that affects data processing.

14. The system of claim 10, wherein the generated industry-specific configuration file is associated with an organization, and the second user is a member of the organization.

15. The system of claim 10, wherein the first user is an accountant, and the second user is a client of the accountant.

16. The system of claim 10, wherein the generated industry-specific configuration file comprises at least one of a command, a value, and an executable.

17. The system of claim 10, wherein the configuration script requests the user settings to supplement default settings of the generated industry-specific configuration file, wherein configuring the second financial management application using the industry-specific configuration file includes storing the user settings and the default settings.

18. The system of claim 10, wherein the configuration script uses one or more user interfaces to obtain settings for the generated industry-specific configuration file.

19. A, server for sharing a plurality of configuration files, the server comprising:
   a network module to receive the plurality of configuration files from a plurality of clients that are coupled in communication through a network, each configuration file being set up to customize user settings of a profile of an application during an initial execution, the network module storing the plurality of configuration files in a configuration file repository; and
   a client interface to share the plurality of configuration files with one or more of the plurality of clients, and send a configuration file responsive to a selection of the configuration file,
   wherein the plurality of clients comprises:
      a configuror client associated with a first user and for executing a first financial management application configured to:
         generate the configuration file; and
         send the configuration file to the network module for storing in the configuration file repository; and
      a configuree client associated with a second user and for executing
         a second financial management application configured to:
            detect an execution of a new profile, wherein the execution of the new profile triggers a configuration script configured to receive user settings for the new profile; and
         the configuration script configured to:
            retrieve the configuration file from the configuration file repository via the client interface; and
            configure the second financial management application using the configuration file.

20. The server of claim 19, wherein the configuration file comprises a chart of accounts.

21. A computer-readable medium storing a computer program product configured to perform a method for customizing a configuration file, the method comprising:
   generating an industry-specific configuration file by a first financial management application executing on a configuror client associated with a first user;
   sending the generated industry-specific configuration file to a configuration file repository executing on a configuration sharing server, wherein the configuration file repository comprises a plurality of industry-specific configuration files;
   detecting execution of a new profile on a second financial management application executing on a configuree client associated with a second user, wherein the execution of the new profile triggers a configuration script that is configured to receive user settings for the new profile;
   selecting, in response to the detecting step, the generated industry-specific configuration file from the configuration file repository;
   retrieving, in response to the selecting step and by executing the configuration script, the generated industry-specific configuration file from the configuration file repository; and
   configuring, by executing the configuration script, the second financial management application using the generated industry-specific configuration file.

22. The computer program product of claim 21, wherein the generated industry-specific configuration file is selected prior to executing the configuration script, and wherein the configuration script is configured in accordance with the generated industry-specific configuration file.

23. The computer program product of claim 21, wherein the generated industry-specific configuration file data comprises business rules that affects data processing.

24. The computer program product of claim 21, wherein the generated industry-specific configuration file comprises a chart of accounts.

25. The computer program product of claim 21, wherein the generated industry-specific configuration file is associated with, an organization, and the second user is a member of the organization.

26. The computer program product of claim 21, wherein the first user is an accountant, and the second user is a client of the accountant.

27. The computer program product of claim 21, wherein the generated industry-specific configuration file comprises at least one of a command, a value, and an executable.

28. The computer program product of claim 21, further comprising: requesting, by executing the configuration script, the user settings to supplement default settings of the generated industry-specific configuration file, wherein configuring the second financial management application using the generated industry-specific configuration file includes storing results of the user settings and the default settings.

29. The computer program product of claim 21, wherein the configuration script comprises one or more user interfaces to enter settings for the second financial management application.

* * * * *

UNITED STATES PATENT AND TRADEMARK OFFICE
CERTIFICATE OF CORRECTION

PATENT NO.         : 7,904,899 B2                                        Page 1 of 1
APPLICATION NO.    : 11/471755
DATED              : March 8, 2011
INVENTOR(S)        : Randy Robalewski et al.

It is certified that error appears in the above-identified patent and that said Letters Patent is hereby corrected as shown below:

In Claim 6, Column 9 (line 6) "with" should be deleted.

In Claim 10, Column 9 (line 35) the "," after "configured" should be deleted.

In Claim 10, Column 9 (line 41) the ";" should be a ":".

In Claim 19, Column 10 (line 6) the "," after "A" should be deleted.

In Claim 25, Column 11 (line 14) the "," after "with" should be deleted.

Signed and Sealed this
Tenth Day of May, 2011

David J. Kappos
*Director of the United States Patent and Trademark Office*